United States Patent [19]

Thomas

[11] 4,031,061
[45] June 21, 1977

[54] RIGID POLYVINYL CHLORIDE COMPOSITIONS WITH HIGH HEAT-DEFLECTION TEMPERATURES

[75] Inventor: James L. Thomas, Hamilton Square, N.J.

[73] Assignee: FMC Corporation, Philadelphia, Pa.

[22] Filed: Nov. 12, 1975

[21] Appl. No.: 631,112

[52] U.S. Cl. .......................... 260/42.29; 260/31.6; 260/31.8 R; 260/40 R; 260/42.49; 260/862; 260/884

[51] Int. Cl.$^2$ ....................................... C08K 3/26

[58] Field of Search ........... 260/42.29, 42.49, 31.6, 260/31.8 R, 40 R

[56] References Cited

UNITED STATES PATENTS

| | | | |
|---|---|---|---|
| 3,310,522 | 3/1967 | Takahashi et al. | 260/42.49 |
| 3,359,193 | 12/1967 | Pinner | 260/42.49 |
| 3,496,253 | 2/1970 | Hamilton et al. | 260/884, 42.49 |
| 3,542,661 | 11/1970 | Klopfer et al. | 204/159.17 |
| 3,557,046 | 1/1971 | Muskat | 260/42.49 |
| 3,661,839 | 5/1972 | Klopfer | 260/42.49 |

FOREIGN PATENTS OR APPLICATIONS 49-16772  1974  Japan

*Primary Examiner*—James H. Derrington
*Attorney, Agent, or Firm*—Milton Zucker; Frank Ianno

[57] ABSTRACT

Polyvinyl chloride compositions with heat-deflection temperatures of above 100° C are obtained by combining suspension grade polyvinyl chloride with diallyl phthalate with or without an unsaturated polyester, and appropriate polymerization catalysts for the diallyl phthalate incorporating into the polymer and polymerizable additive high loadings of ground limestone, from about 40% to about 100% of the total weight of final polymer, and conventional stabilizers for polyvinyl chloride.

1 Claim, No Drawings

RIGID POLYVINYL CHLORIDE COMPOSITIONS WITH HIGH HEAT-DEFLECTION TEMPERATURES

This invention is concerned with rigid polyvinyl chloride molding compositions of high heat-deflection temperatures, and aims to provide such compositions useful in the manufacture of pipes for the transportation of hot water, and for other uses where high heat-deflection temperatures are essential.

Polyvinyl chloride (PVC) resins are widely used for the preparation of a wide variety of products. They are made in two principal grades, a suspension grade of rather coarse particle size, and an emulsion grade of much finer particle size, obtained respectively by suspension and emulsion polymerization of vinyl chloride monomer.

Polyvinyl chloride may be made into flexible articles by the use of plasticizers, or into rigid articles by not using plasticizers, or by adding thermosetting plasticizers which are thermoset during the molding operation. Diallyl phthalate is one such thermosetting plasticizer. Havitton et al, U.S. Pat. No. 3,496,253, issued Feb. 17, 1970, shows a method of making molding powders from dispersion grade PVC and diallyl phthalate.

PVC itself, and PVC compositions made with thermosetting plasticizers like diallyl phthalate, are not useful in the production of products which must withstand high temperatures — e.g. — in the production of pipes for carrying hot water. Unfilled PVC, melted at typical temperatures of about 150° C, has a heat-deflection temperature at 66 psi fiber stress (the conditions of the standard ASTM method D 648.72) of about 75° C. For hot water pipes, and for similar uses, temperatures of above 100° C are desirable.

It is well known that the addition of glass fiber will generally raise the heat-deflection temperatures of plastics substantially — see, for example, Klopfer U.S. Pat. No. 3,661,839 issued May 9, 1972 and Klopfer et al U.S. Pat. No. 3,542,661 issued Nov. 14, 1970 where glass fibers are used for this purpose in PVC compositions containing a reactive plasticizer. However, the addition of glass fibers requires melting the resin and blending it with the glass fibers on a heavy duty mixer, followed by extrusion of the melted composition through an extruder. This operation is difficult, time consuming, and requires specialized equipment to carry out such processing. Moreover, the use of glass limits the sort of molding that can be made, so that only relatively simply shaped articles can be produced.

Hence, for uses where inclusion of glass fibers is not desired, and where high heat-deflection temperatures are necessary, the art has employed the much more expensive chlorinated PVC, which has a heat-deflection temperature of 107° C at 66 psi fiber stress.

In accordance with this invention, I obtain moldable compositions by combining with polyvinyl chloride, which is at least 50% suspension grade, from 10 to 50%, based on polyvinyl chloride content, of a polymerizable plasticizer which is entirely or largely diallyl phthalate, and which preferably contains of the order of up to 15% of a copolymerizable unsaturated polyester, together with a polymerization catalyst for the diallyl phthalate and a stabilizer for the polyvinyl chloride, and dispersing ground limestone in the composition, using from about 40% to 100% of ground limestone based on the combined weight of polyvinyl chloride and plasticizer. Such compositions yield inexpensive moldings with heat-deflection temperatures of above 100° C, which can be safely used for the handling of hot water, and the like.

The basis for the molding compositions described herein is, of course, polyvinyl chloride. However, the small particle-size product made by typical emulsion polymerization, cannot be used as the sole source of polyvinyl chloride. It is necessary that at least about 50% of the polyvinyl chloride be of large particle size such as is obtained by suspension polymerization.

A second essential ingredient of the compositions of this invention is diallyl phthalate, preferably diallyl orthophthalate. It should be used in amounts from about 10% to about 50% of the weight of the polyvinyl chloride. It acts as an effective plasticizer in the composition during dispersion of the limestone and during the molding operation, and after curing it increases the desired rigidity of the cured structure.

The substitution of about 5–15% of the diallyl phthalate with an unsaturated polyester gives some advantage during blending and molding operations. These polyesters are esters of glycols and polybasic acids, with sufficient unsaturated acid present so that the composition will thermoset when appropriately catalyzed with a vinyl polymerization catalyst. In general, at least about 25 to 50 mol % of the polybasic acid is unsaturated.

A third essential ingredient of the composition is a filler, which acts to stiffen the molded composition and to raise the heat-deflection temperature. The filler should be present in at least about 40% by weight of the combined polyvinyl chloride and plasticizer compound. Amounts up to about 100% of PVC+plasticizer may be used without running into any significant difficulties. At higher loadings, processing difficulties are encountered so that it is desirable to avoid substantially higher loading.

The filler should essentially comprise ground limestone — either ordinary or dolomitic, ground to a fine particle size of at least −200 standard U.S. mesh, and preferably finer. Minor proportions of other fillers may be used.

Of course, it is essential that the composition contain a vinyl polymerization catalyst. The catalyst may be any free radical initiator that operates at the polymerization temperature required by diallyl phthalate — typically, an organic peroxide such as benzoyl peroxide is the preferred type of catalyst. Similarly, a PVC stabilizer should be included like liquid organic tin complexes or lead carbonate. These stabilizers generally act to neutralize trace quantities of hydrochloric acid resulting from slight decomposition of PVC during molding.

The compounds may be colored by adding pigments in minor quantities, or modified with other desired additives, such as mold lubricants and the like.

The following typical examples of the invention are given by way of example, and not by way of limitation. Lettered examples are comparative examples which show prior art results, or results with compositions where the proportions do not give the results obtained with this invention; numbered examples are of the invention.

Table I below shows the problems encountered with the use of emulsion grade PVC (Examples A, B, C, D, E) and the results obtained when suspension grade PVC was substituted in part (Examples 1 and 2). All of the amounts shown are parts by weight. In all cases the ingredients of the compositions set forth in the following examples were balled-milled for a minimum of sixteen hours, placed in a mold, and heated to 340° F under a pressure of 2000 psi for ten minutes. The molded samples were then tested for physical properties by appropriate ASTM methods as follows:

Heat Deflection; ASTM D 648–61
Rockwell Hardness; ASTM D 785–65
Shore Hardness D; ASTM D 2240–68
Flexural Strength, and Modules; ASTM D 790–66
Tensile Strength ASTM D 638–68 rise from slight filling. It should be noted that Examples I and J molded with great difficulty, and could not be molded into many shapes.

TABLE II

| Sample Reference | Example F | Example G | Example H | Example I | Example J | Example K | Example L | Example M |
|---|---|---|---|---|---|---|---|---|
| Geon 102 EP, suspension PVC | 200 | 200 | 200 | 200 | 200 | 500 | 500 | 500 |
| 90/10 DAP, Dion 6427 | | | | | | 250 | 250 | 300 |
| Camel Tex (ground limestone —325 mesh) | 20 | 60 | 80 | 100 | 120 | — | — | — |
| t-butyl perbenzoate, gm | | | | | | 5 | 5 | 6 |
| Benzoyl Peroxide, gm | | | | | | 5 | 5 | 6 |
| 6% Cobalt Naphthenate, gm | | | | | | 0.25 | 0.25 | 0.25 |
| Lead Carbonate | 10 | 10 | 10 | 10 | 10 | 25 | 50 | 25 |
| % Filler | — | — | — | — | — | — | — | — |
| % DAP/Polyester Resin | — | — | — | — | — | — | — | — |
| Heat-Deflection Temp. ° C | 89 | 88 | 90 | 90 | 90.5 | 83 | 92 | 88 |

Table III below — Examples N, O, P, Q show the results obtained with the ingredients of this invention outside of the proportions necessary to get desirable heat-deflection temperatures. Note that the ground limestone in these examples reaches a maximum of about 36%, and the highest heat-deflection temperature is 91° C.

Examples R and S are included for a comparison of physical properties with unfilled chlorinated PVC (Geon 3010) and unfilled suspension grade PVC (Geon 102 EP), both being commercially available PVC materials.

TABLE I

| Sample Reference | Example A | Example B | Example C | Example D | Example E | Example 1 | Example 2 |
|---|---|---|---|---|---|---|---|
| Geon 121 (emulsion grade PVC) | 250 gm | 250 gm | 250 gm | 250 gm | 250 gm | 62 gm | 125 gm |
| Geon 102 EP (suspension grade PVC) | | | | | | 188 gm | 125 gm |
| Diallyl ortho-phthalate (DAP) | | 25 gm | 50 gm | | | 50 gm | 50 gm |
| 90/10 DAP, Dion 6427* | | | | 25 gm | | | |
| 95/5 DAP, Dion 6427* | | | | | 50 gm | | |
| Benzoyl Peroxide | | 0.5 gm | 1.0 gm | 0.5 gm | 0.0 gm | 1.0 gm | 1.0 gm |
| t-Butyl Perbenzoate | | 0.5 gm | 1.0 gm | 0.5 gm | 1.0 gm | 1.0 gm | 1.0 gm |
| 6% Cobalt Naphthenate | | 0.25 gm | 0.5 gm | 0.25 gm | 0.5 gm | 0.5 gm | 0.5 gm |
| Camel Tex (ground limestone —325 mesh) | | 250 gm | 300 gm | 250 gm | 300 gm | 300 gm | 300 gm |
| Lead Carbonate | 13 gm | 13 gm | 13 gm | 13 gm | 13 gm | 13 gm | 13 gm |
| Heat-Deflection Temp. ° C (at 66 psi) | 76 | 79 | 81 | 73 | 81 | 119 | 107 |

*Dion 6427 is a glycol-maleic-isophthalate polyester with a molar ratio of 2 maleic to 1 isophthalates Table II below (Examples F to M) shows that with suspension grade PVC, neither ground limestone nor diallyl phthalate, added separately, have any marked effect on heat-deflection temperature, beyond an initial

TABLE III

| Sample Reference | Example N | Example O | Example P | Example Q | Example R Chlorinated PVC (Geon 3010) | Example S Stabilized (Geon 102 EP) PVC unfilled |
|---|---|---|---|---|---|---|
| Geon 102 EP (suspension grade PVC) | 500 | 500 | 500 | 500 | | |
| 90/10 DAP/Dion 6427, gm | 50 | 50 | 75 | 75 | | |
| t-Butyl Perbenzoate, gm | 0.5 | 1.0 | 0.5 | 1.5 | | |
| Benzoyl Peroxide, gm | 0.5 | 1.0 | 0.5 | 1.5 | | |
| 6% Cobalt Naphthenate, gm | 0.25 | 0.5 | 0.25 | 0.25 | | |
| Camel Tex (ground limestone —325 mesh) | 200 | 150 | 200 | 200 | | |
| Lead Carbonate | 13 | 26 | 13 | 13 | | |
| Heat Deflection Temp. ° C (at 66 psi) | 91 | 89 | 91 | 90 | 107 | 76 |
| Rockwell Hardness L | 98 | 99 | 100 | 99 | | 94 |
| Shore Hardness D | 87 | 87 | 87 | 87 | | 84 |
| Flexural Strength, psi | 11,900 | 13,000 | 12,057 | 10,300 | 7,300 | 14,600 |
| Modulus × 10⁶ psi | 0.8 | 0.7 | 0.8 | 0.8 | 0.9 | 3.9 |
| Tensile Strength, psi | 7,900 | 7,500 | 8,600 | 5.800 | 4,200 | 8,000 |

TABLE IV

| | EXAMPLES OF THE INVENTION | | | | | | | |
|---|---|---|---|---|---|---|---|---|
| | Example 3 | Example 4 | Example 5 | Example 6 | Example 7 | Example 8 | Example 9 | Example 10 |
| Geon 102 EP (Suspension grade PVC) | 500 | 500 | 500 | 500 | 500 | 500 | 500 | 500 |
| 90/10 DAP 6427, gm | 100 | 75 | 100 | 100 | 125 | 150 | 125 | 250 |
| t-Butyl Perbenzoate, gm | 0.5 | 1.5 | 0.5 | 0.5 | 2.5 | 3.0 | 2.5 | 5.0 |
| Benzoyl Peroxide, gm | 0.5 | 1.5 | 0.5 | 0.5 | 2.5 | 3.0 | 2.5 | 5.0 |
| 6% Cobalt Naphthenate, gm | 0.25 | 0.25 | 0.25 | 0.25 | 0.5 | 0.25 | 0.25 | 0.25 |
| Camel Tex (ground limestone −325 mesh) | 250 | 300 | 350 | 300 | 415 | 430 | 250 | 500 |
| Lead Carbonate | 13 | 13 | 13 | 13 | 52 | 54 | 13 | 58 |
| Heat-Deflection Temp. °C (at 66 psi) | 105 | 116 | 136 | 142 | 156 | 166 | 115 | 165 |
| Rockwell Hardness L | 99 | | 99 | 97 | | | | M84 |
| Shore Hardness D | 87 | | 88 | 88 | | | | |
| Flexural Strength, psi | 12,000 | | 9,900 | 8,800 | | 10,700 | | 10,900 |
| Modulus × $10^6$ psi | 0.8 | | 0.9 | 0.9 | | | | 0.9 |
| Tensile strength, psi | 7,800 | | 6,500 | 5,900 | | 7,700 | | 6,700 |

Examples 3 to 10 show the results obtained within the scope of this invention. In Example 3, at about 40% loading of filler, the heat-deflection temperature is 105° C; the other examples indicate what increases are obtainable as the upper limits are approached.

The examples can be multiplied indefinitely without departing from the scope of the invention as defined in the claims.

I claim:

1. A polyvinyl chloride molding composition consisting essentially of an intimate mixture of 10 to 50%, based on polyvinyl chloride weight, of a plasticizer consisting of from 85 to 100% by weight diallyl phthalate and 0 to 15% by weight of a polymerizable unsaturated glycol-polybasic acid polyester containing sufficient unsaturated acid so that it will thermoset when appropriately catalyzed with a vinyl polymerization catalyst, a polymerization catalyst for the diallyl phthalate and a stabilizer for the polyvinyl chloride, 40 to 100% by weight of finely divided ground limestone based on the combined weight of polyvinyl chloride and plasticizer, the remainder being a polyvinyl chloride of which at least 50% by weight is suspension grade, and such composition when molded and cured having heat-deflection temperatures in excess of 100° C.

* * * * *